United States Patent
Jensen (10) Patent No.: US 8,224,854 B2
(45) Date of Patent: Jul. 17, 2012

(54) SYSTEM AND A METHOD FOR IDENTIFYING EVENTS USING A TABLE

(75) Inventor: Søren Borup Jensen, Struer (DK)

(73) Assignee: Bang & Olufsen A/S, Struer (DK)

( * ) Notice: Subject to any disclaimer, the term of this patent is extended or adjusted under 35 U.S.C. 154(b) by 301 days.

(21) Appl. No.: 12/320,758

(22) Filed: Feb. 4, 2009

(65) Prior Publication Data

US 2009/0210393 A1  Aug. 20, 2009

Related U.S. Application Data

(60) Provisional application No. 61/006,872, filed on Feb. 5, 2008.

(51) Int. Cl.
*G06F 7/00* (2006.01)
*G06F 17/30* (2006.01)

(52) U.S. Cl. ........................ 707/790; 707/705

(58) Field of Classification Search ............ 707/705, 707/790
See application file for complete search history.

(56) References Cited

U.S. PATENT DOCUMENTS

| | | | | |
|---|---|---|---|---|
| 5,864,868 A | * | 1/1999 | Contois | 1/1 |
| 6,953,886 B1 | * | 10/2005 | Looney et al. | 84/615 |
| 2002/0198872 A1 | * | 12/2002 | MacNicol et al. | 707/3 |
| 2005/0289111 A1 | | 12/2005 | Tribble et al. | |
| 2006/0179077 A1 | | 8/2006 | Berstis et al. | |
| 2006/0218292 A1 | | 9/2006 | Woodward et al. | |
| 2008/0126936 A1 | * | 5/2008 | Williams | 715/717 |

FOREIGN PATENT DOCUMENTS

| | | | |
|---|---|---|---|
| GB | 2 304 489 | * | 3/1997 |
| JP | 2006-189490 | | 7/2006 |
| KR | 10-2004-0013763 | | 2/2004 |

* cited by examiner

*Primary Examiner* — Charles Lu
(74) *Attorney, Agent, or Firm* — Harness, Dickey & Pierce, P.L.C.

(57) ABSTRACT

A system for identifying one or more events, each event being characterized by information relating to one or more parameters, the system comprising a means for holding or accessing a table having a plurality of columns and rows, each of one or more columns representing one of the parameters, each of one or more of the rows comprising an identification of one or more of the events for each of the parameters in relation to which information characterizes the one or more of the event(s), pertaining information provided in the pertaining column, means for identifying one or more events characterized by one or more predetermined values and/or intervals of one or more predetermined parameters by identifying one or more rows in which the information of the column(s) representing the predetermined parameter(s) corresponds to the predetermined value(s)/interval(s) and identifying the one or more events from the identification in the identified row(s).

18 Claims, 3 Drawing Sheets a)

| | Parm-1 and | Parm-2 and | Parm-3 ---- and | Parm-n |
|---|---|---|---|---|
| | xxp | yyp | zzp | qyz |
| or | xxr | yyp | zzp | qzx |
| or | xxs | yyr | zzr | qyx |
| or | xxs | yys | zzs | qzy |
| or | xxs | yyr | zzr | qxz |
| . | | | | |
| . | | | | |
| or | xxp | yyr | zzr | qxy | constraint table 305
300 constraint table                   310 attribute b)

| | Parm-1 and | Parm-2 and | Parm-3 -- and 3 | Parm-n |
|---|---|---|---|---|
| | xp | yp | zp | xyz |
| or | xr | yp | zp | yzx |
| or | xs | yr | zr | zyx |
| or | xs | ys | zs | xzy |
| or | xs | yr | zr | yxz |

SYSTEM AND A METHOD FOR IDENTIFYING EVENTS USING A TABLE

CROSS-REFERENCE TO RELATED APPLICATIONS

This application claims priority under 35 U.S.C. §§119 on Provisional Application No. 61/006,872 filed on Feb. 5, 2008.

The present invention relates to a system and a method of identifying events using a simple table, rows or columns of which hold relevant parameters of events in addition to an identification of the pertaining event(s).

The huge amount of products that are available for daily use to support information access e.g. processing Internet news, music, movies, pictures, ordinary DVD's and CD's, media broadcasts, and telecommunication information raises a strong demand for intelligent and simple-to-use equipment, with an effective and fast mode of operation for accessing the user relevant information. Traditionally search in digital data information has been carried out in a sequential mode in tree oriented structures. This mode of search includes the method of backtracking and depth-first and/or breath-first strategies, all in all which are very slow and inconvenient to use, due to high demand for resources as time and/or memory. The prior art systems normally includes a relational database system which are not convenient to use in man-machine-interface application having a requirement of quick response time. The invention may be considered as a real time dynamic database system, where relations are defined by constraints among variables.

The constraints are all defined in a table that may be reloaded into the application at any time, which makes the system very flexible in terms of changing search criteria and references to the content in media files and the corresponding presentation of information at the user interface.

In a first aspect, the invention relates to a system for identifying one or more events, each event being characterized by information relating to one or more parameters, the system comprising:

means for holding or accessing a table having a plurality of columns and rows, each of one or more columns representing one of the parameters, each of one or more of the rows comprising:
an identification of one or more of the events,
for each of the parameters in relation to which information characterizes the one or more of the event(s), pertaining information provided in the pertaining column,
means for identifying one or more events characterized by one or more predetermined values and/or intervals of one or more predetermined parameters by:
identifying one or more rows in which the information of the column(s) representing the predetermined parameter(s) corresponds to the predetermined value(s)/interval(s) and
identifying the one or more events from the identification in the identified row(s).

In this context, an event may be any type of experience, one or more persons may have, such as any movie, video, podcast, broadcast TV/sat program, live show of any kind, any type of music (radio/video, live, or recorded), web browsing, image/picture/photo, activity (playing games, browsing, exercise, sports, communicating with others in any manner, such as texting/SMS and/or e-mail), or the like.

In the present context, a parameter may be any type of information describing the event or persons/elements having an effect thereon or being a part thereof, such as author, title, artist, actor, genre, production date/year and the like.

Other types of parameters relate more to a person's own taste, such as the persons favourites, last played, often played, or the like.

Additional parameters relate to the fact that multiple users may access the system, whereby a person's ID may also be a parameter. Thus, e.g. the "favourite" parameter may be set for a particular person, and a parameter may be set allowing or refusing the person to experience the event, such as would be consistent with the age limitation on e.g. DVDs. The user identification code could be a simple ID# or more advanced profile; the identification could be obtained via standard means like iris detection, finger prints or other biometrical means. Naturally, the fact that multiple persons could be in a room at the same time may be taken into account.

Other parameters may relate to a situation or circumstances during or under which the event should be, must be, or should/must not be experienced, such as mood, emotion, physical activity level, pulse, number of persons in the room, smell, weather, time of day/week/year, illumination level or the like.

Naturally, a parameter may be quantified or described in a number of manners. An example is the genre of music or a movie. The genre of music may be described in words as e.g. "jazz", "pop", "hip hop" or the like. Alternatively the same denotation may be made with an integer, if e.g. "jazz" was represented by the integer "1", "pop" with "2", "hip hop" with "3", and so on. In the latter situation, the integer may be used not only to determine identity between a sought after genre (such as hip hop) and the genre of a row/event presently evaluated, but an interval may be defined (genre between 2 and 5), or the degree of overlap with a desired genre, e.g. 3, may be searched for, whereby a genre of 1 is two from the optimum genre.

Other parameters, such as titles, will usually be provided as text, as would artists. However, groupings may be made, such as all titles on an album, or e.g. groups in which individual persons also make solo albums (such as Michael Jackson also being a member of Jackson Five) whereby the individual artist but also the group may be used in the search.

Alternatively, it may be decided to, for an event or a group of events, not provide information relating to one or more parameters, if e.g. this information is not relevant to the event(s) or if no such information is available.

The events or media data files as well as the relevant parameters may reside in standalone units and/or in one or more units on a network onto which the units are connected. This connection may be via standard means and standard protocols and as wired or as wireless e.g. a Bluetooth, WiFi or a Wireless LAN. Furthermore the units may be connected to the global WWW network in order to gain access thereto via the WWW or even purchase events via the WWW.

The connected units may be of whatever type of equipment e.g., but not limited to, PC's, TV's, home appliances, SD card interfaces, AV systems or any kind of media players. The units may be portable devices as well e.g., but not limited to, PDA's, phones, media controllers, and media players.

Thus, the means for holding or accessing a table may be standard storage circuits or means and/or communication elements adapted to communicate with local or remote storage circuits or means or servers or services.

Naturally, even though the present table is described with columns representing parameters and rows comprising the pertaining information and identification of event(s), this may be interchanged so that rows represent parameters and columns comprising the pertaining information and identification of event(s).

In the present context, each of one or more columns represents one of the parameters, such that each column may have information relating to that parameter. Naturally, no information may be provided, if the parameter is not relevant to the event(s) of a row or if the information is not available.

Also, each of one or more of the rows comprises an identification of one or more of the events. In this respect, this identification could be a link or reference to a position (in a memory, on a computer, storage, server, network or the like) of the event, an ID of the event for use in retrieving or gaining access thereto, or it may be the actual event, such as in the form of a digital file.

When a row has provided therein one or more of the parameters characterizing the one or more of the event(s), the information in this row may be used in searches based on such parameters. In this manner, this particular information is easily found and analyzed in the table.

Naturally, the identifying means may identify rows in which the parameters are identical to the sought after parameters or may simply identify whether information is available at all. The mere existence of information may be seen as compliance with the search strategy. An alternative is the determination of whether the parameter or information is within determined intervals or within a given "distance" from a desired parameter. Other parameters may be represented by Boolean values or symbolic values (such as ones with the values "red", "blue", "male", "female", "Caucasian", "Asian", "Mexican", "Denmark", "Germany", or the like). Integers, real numbers or the like may be compared using any of the arithmetic operators, and parameters such as Booleans or symbolic parameters may be compared using Boolean operators.

Having identified one or more rows, one or more events are identified, and this or these events may form the basis of additional searching or may be provided to the person.

Multiple manners exist of adding events to an existing table. This further event may be e.g. a newly downloaded event or an event purchased on CD-ROM/DVD or the like. Alternatively, external sources may be allowed to push or offer events for sale/lease by adding the information to the table, where the identification of the event then requires purchase, before the event is made available.

In one embodiment, the system further comprises:
means for receiving or obtaining:
  an identification of a further event as well as
  information relating to one or more parameters characterizing the further event, and
means for adding, to the table, a new row having the identification and, for each of the parameters in relation to which information characterizes the further event, pertaining information provided in the pertaining column.

In this situation, the parameters in relation to which information is received or obtained normally will be the parameters in relation to which columns are already provided in the table. If not, a new column may be provided and pertaining information provided therein from the further event. Also, such information may be derived or obtained in relation to events already represented in other rows.

In another embodiment, the system further comprises:
means for receiving or obtaining:
  an identification of a further event as well as
  information relating to one or more parameters characterizing the further event, and
means for identifying a row having, at each of the parameters in relation to which information characterizes the further event, pertaining information provided in the pertaining column, and for adding the identification of the further event to the identification(s) provided in the identified row.

Thus, it may be found that the event requires no new row but may be provided or represented by an existing row. Naturally, a combination may be desired in that the same event may be represented in multiple manners, such as by itself, on a "greatest hits" album, and on an album on which multiple artists perform.

In one embodiment, one of the parameters relates to an identity of one or more users allowed to or to be prevented from experiencing one or more of the events, the system further comprising:
means for determining an identity of a user,
means for evaluating, from the one parameter of the identified rows, whether the user is to be prevented from or allowed to experience the pertaining event(s) and for allowing or preventing the user from experiencing the pertaining event(s).

The determination of the identity of a user may be obtained from the person's finger print, iris, voice, passport, face, gesture, the presence of a particular element, such as an RF tag, personal to the person, or simply by the person entering his/her identity on e.g. a keyboard.

The table may, in relation to the one parameter, have information as to which person(s) is/are not allowed to experience the event(s) and are allowed to experience the event(s). The allowing the user to experience the event may be the providing of the event or not blocking access to the event.

Preventing may be the blocking of any providing means adapted to provide events to the person or the blocking of the actual event(s) or any communication channel there between.

In one embodiment, different types of events require different means for providing the events to the user, wherein one of the parameters relates to means required for providing an event, the system further comprising means for identifying or sensing available event providing means, and wherein the identifying means are adapted to identify, on the basis of the available event providing means and the column(s) representing the one parameter, rows, the event(s) of which may be provided by the available event providing means.

The different means may be speakers for providing audio to a person, whereas a monitor/TV will be required to provide video to the person-normally in addition to speakers. If the event is a text, such as a book, an article, a web-page, or the like, a monitor may suffice.

In addition, different video events may require a certain size/colour palette, resolution, refresh rate, or the like, of a monitor, or the event may be best presented by that size or the like, as may certain audio be best presented using a surround sound system and not merely in stereo. This information may be provided in the table, and it may be decided to not provide the event, if the desired means are not available.

An alternative could be to have the event represented in different versions, one for low resolution and one for higher resolution, e.g., whereby the most suitable version is then identified in the search.

In one embodiment, the identifying means are adapted to select a sub-group of the identified event(s) on the basis of further selection parameters. In addition to the parameters of the table, additional search parameters may be used to select a subgroup of events identified in e.g. a search. A particular type of search is one in which combined parameters of the identified events are used, such as:
compile a number of the events to an overall duration of e.g. 80 minutes, or compile a subgroup of the events, primarily fulfilling a particular parameter, such as an artist, whereby a lower number of events not with the particular artist are also included.

In one embodiment, the system further comprises the above-mentioned means for providing the identified one or more events to a user.

In a preferred embodiment, the identifying means are adapted to, for each of a number of rows, performing a comparison, for each of the predetermined parameters, of the predetermined value and/or interval and the information in the pertaining columns of the actual row, the row being identified if, for all predetermined parameters, the information corresponds to the value/interval. Thus, the same operation is performed for each row, which makes the operation of the system rather simple.

Another aspect of the invention relates to a method of identifying one or more events, each event being characterized by information relating to one or more parameters, the method comprising:
  providing or accessing a table having a plurality of columns and rows, each of one or more columns representing one of the parameters, each of one or more of the rows comprising:
    an identification of one or more of the events,
    for each of the parameters in relation to which information characterizes the one or more event(s), pertaining information provided in the pertaining column,
  identifying one or more events characterized by one or more predetermined values and/or intervals of one or more predetermined parameters by:
    identifying one or more rows in which the information of the column(s) representing the predetermined parameter(s) corresponds to the predetermined value(s)/interval(s) and
    identifying the one or more events from the identification in the identified row(s).

As mentioned above, the table may be provided or accessed either locally or remotely via any desired means such as LAN, WAN, WWW, wireless networks, or the like.

Also, the columns and rows may be interchanged so that each of one or more rows represent one of the parameters, and the one or more of the columns comprise the identification and the pertaining information.

In addition, as mentioned above, the identification may be based on identity between the sought for parameter and that of a row, the mere existence of information at the column, or that the parameter is within a sought for interval or within a given distance from the optimum parameter.

Finally, the event(s) is/are identified from the rows.

In one embodiment, the method further comprises the steps of:
  receiving or obtaining:
    an identification of a further event as well as
    information relating to one or more parameters characterizing the further event, and
  adding, to the table, a new row having the identification and, for each of the parameters in relation to which information characterizes the further event, pertaining information provided in the pertaining column.

Alternatively or in addition, the method may further comprise the steps of:
  receiving or obtaining:
    an identification of a further event as well as
    information relating to one or more parameters characterizing the further event, and
  identifying a row having, at each of the parameters in relation to which information characterizes the further event, pertaining information provided in the pertaining column, and adding the identification of the further event to the identification(s) provided in the identified row.

In one embodiment, one of the parameters relates to an identity of one or more users allowed to or to be prevented from experiencing one or more of the events, the method further comprising the steps of:
  determining an identity of a user,
  evaluating, from the one parameter of the identified rows, whether the user is to be prevented from or allowed to experience the pertaining event(s) and allowing the user to or preventing the user from experiencing the pertaining event(s). As mentioned above, preventing may be the preventing of operation of providing equipment, the prevention of access to the event(s) and/or preventing of operation or contact in elements or communication there between.

In one embodiment, different types of events require different means for providing the events to the user, wherein one of the parameters relates to means required for providing an event, the method further comprising the step of identifying or sensing available event providing means, and wherein the identifying step comprises identifying, on the basis of the available event providing means and the column(s) representing the one parameter, rows, the event(s) of which may be provided by the available event providing means.

As described above, the identifying step may comprise selecting a sub-group of the identified event(s) on the basis of further selection parameters.

Also, the method may further comprise the step of providing the identified one or more events to a user.

In a preferred embodiment, the identifying step comprises, for each of a number of rows, performing a comparison, for each of the predetermined parameters, of the predetermined value and/or interval and the information in the pertaining columns of the actual row, the row being identified if, for all predetermined parameters, the information corresponds to the value/interval. Thus, the determination performs the same operation for each row, which makes the operation quite simple.

In the following, preferred embodiments of the invention will be described with reference to the drawings, wherein.

The present embodiment is run as an application on the main processor of a specific product, e.g. a AV system or a PC system with information display or any other type of multimedia centre/device/system being able to search for, process and present digital sources of information.

In addition, the product has a Constraint Solver Domain description, which comprises a table with digital data representing the constraints relevant for the product itself and for the product in the access to media information in terms of digital data located on the product itself, or located on units connected to the network and comprises a corresponding search function termed a Constraint Solver Engine, which is a combinatorial solver mechanism governing the allowances and functions for such search, filtering and presentation for the user.

All of or some of the events may be stored in or on the system, such as in electronics thereof, such as in the form of a RAM, ROM, PROM, EPROM, EEPROM, Flash, podcast, disc, card (SD, miniSD, microSD or the like), hard disc or the like or may be one or more CD-ROM/DVD discs, and/or electrical, magnetic, or optical, or the like, storage.

Alternatively or in addition all of or some of the events may be available thereto from a number of sources, such as from a near-by or internal storage, a remote storage, via a network of any type, or by being streamed from an external source, such as via the WWW or via airborne signals, such as TV or radio signals. This access and communication is handled by the electronics, which comprises or communicates to or via e.g. one or more networking elements, such as NIC's, network adapters, wireless communication devices, routers, switches, Bluetooth elements, IR communication elements, other computers or servers, thin clients, intra nets, the WWW, WANs, LANs or the like.

According to the present embodiment, the constraint solver domain table is organized as relations among variables in the general mathematical notation of 'Disjunctive Form':

AttribVariable 1.1 and AttribVariable 1.2 and AttribVariable 1.3 and AttribVariable 1.n
Or AttribVariable 2.1 and AttribVariable 2.2 and AttribVariable 2.3 and AttribVariable 2.n
Or . . . .
Or . . . .
Or AttribVariable m.1 and AttribVariable m.2 and AttribVariable m.3 and AttribVariable m.n For example, AttribVariable 1.1 may be an artist ID; AttribVariable 1.2 a record label; AttribVariable 1.3 a title; and AttribVariable 1.n a user identification; AttribVariable 2.n may be a reference to another table or an action code that addresses the deduced action to take place when the specific legal combination of variables is fulfilled.

All parameters which may characterize an event may be used in the present context. In addition, further parameters not describing the event but which relate to e.g. settings or circumstances by or under which the event could be or should be experienced may also be used.

With this method of defining the problem domain, it becomes a multi-dimensional state space enabling equal and direct access to any point in the defined set of solutions. The term multidimensional has to be understood as a contrast to a tree-like programming structure, which normally is two-dimensional.

Figure 1:
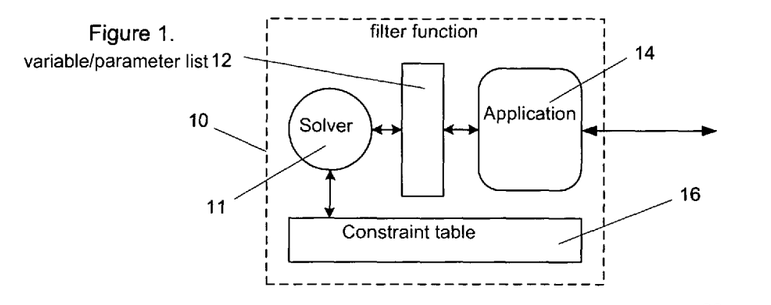
FIG. 1 displays overall elements of a constraint solver.
Figure 2:
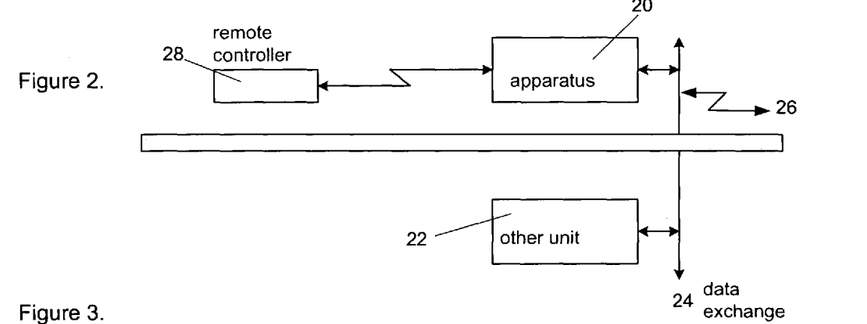
FIG. 2 displays an apparatus network connection option.

In the embodiment in FIG. 1 and FIG. 2, a search and filter function 10 proceeds by finding the result of an interrogation in the set of allowed and possible combinations in a Constraint Table 16.

This table holds a plurality of rows and columns where each row or column represents one or more events and where others of the rows or columns (the other dimension) relates to the parameters of the event(s). Thus, at the intersection between a row and a column, information relating to the pertaining event(s) and the pertaining parameter may be found.

The interrogation from the application 14 to/from a constraint solver 11 is via the variable/parameter list 12. Actual filter attributes, that reflect the required search strategies, are passed as variable/parameter values to the constraint solver via the variable list 12. The results of the deduction performed by the solver 11 may be applied or used locally in a unit 20 and/or may be exchanged 24 with an application in another unit 22. The user commands may be given directly into the apparatus 20 and/or via a wireless remote controller 28 communicating with the apparatus 20.

According to definitions made in the constraint tables, the result might be:
a list of events or variables/parameters useful in the application 14, e.g. as the list of object files found to fulfil the given search criteria.
an action code e.g. a ID of an event to be provided by the application 14, the ID number being fetched from the constraint table 16.

Figure 3:
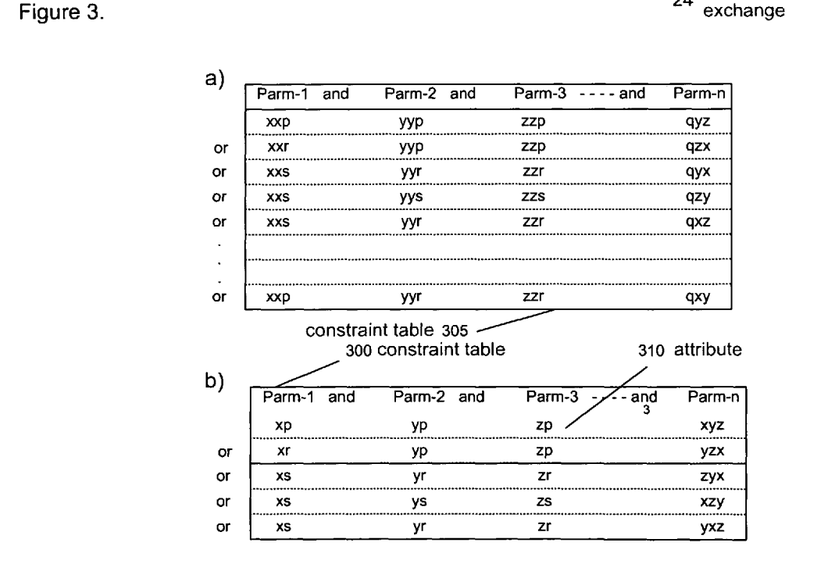
FIGS. 3 and 5 illustrates combined data definitions for constraints.

FIG. 3 is a general model of a Constraint Table 300,305. The Constraint Table represents the set of legal combinations defined for a number of parameters 'Parm-x' 300 with the attributes of these 310. The attributes/entries 310 in the table refer to the different objects that constitute the type of the file to address, the filter criteria that define the mapping of one representation to another representation of the data files fulfilling the search criteria, and/or units interconnected in the network, units that may have media source files to offer.

For example:
The attribute xp may refer to an artist,
The attribute yp may refer to a genre,
The attribute xyz may refer to a filter attribute e.g. one of composer, album, genre of a set of media files,
The zp parameters may refer to functions to be initiated related to UI and according to the actual mode of operation, and/or actual shift in the mode of operation.

Thus, the one or more tables in FIG. 3 would contain all legal combinations the different parameters, "legal" meaning that one or more of the events having the particular combination of parameters. Naturally, if different groups may be made of the events, these may be presented in any desired manner, such as a universe of points (illustrating stars), one or more clusters, as a single group merged, and these groups may be stationary or move between each other.

The transition parameters that may apply are, but not limited to: author, title, artist, actor, genre, production date/year and the like.

Other types of parameters relate more to a person's own taste, such as the persons favourites, last played, often played, or the like.

Additional parameters relate to the fact that multiple users may access the system, whereby a person's ID may also be a parameter. Thus, e.g. the "favourite" parameter may be set for a particular person, and a parameter may be set allowing or refusing the person to experience the event, such as would be consistent with the age limitation on e.g. DVDs. The user identification code could be a simple ID# or more advanced profile; the identification obtained via standard means like iris detection, finger prints or other biometrical means. Naturally, the fact that multiple persons could be in a room at the same time may be taken into account.

Other parameters may relate to a situation or circumstances during or under which the event should be, must be, or should/ must not be experienced, such as mood, emotion, physical activity level, pulse, number of persons in the room, smell, weather, time of day/week/year, illumination level or the like.

Naturally, also other manners exist of performing additional searches in the table, such as on the basis of a first search. Thus, an event may be used as a seed to perform e.g. MOTS (more of the same) search for similar types of events. This search may also identify parameters or parameter intervals used as a further search strategy.

Additionally, a parameter may be used for e.g. informing the system of how to present the results of the search, such as on a display (cluster list, floating, organized, vertically, horizontally, diagonally, radial, spiral, concentric, stack).

Further parameters may relate to which devices or means are required to provide the event(s), such as audio or video equipment. Such parameters may be even more specific in that they may relate to:

Physical location of all devices that may interact; interaction via networks either wireless or wired; interaction via IR- or RF communication and according to standard protocols.

Physical location of the user; the location determined by standard means, e.g. a movement detector or biometrics sensing as disclosed above.

Context into which the related activities are part of i.e. date-and-time-of-day.

Device types and their attributes: TV set, PC, AV system, multimedia server, PDA, cell phone, remote control device, media player, digital storage, home appliances etc.

The present type of table is typically very large and can have millions of attributes/entries. Standard compressing techniques might be applied to reduce the size of the combinatorial state space and still maintaining the logical consistency.

In connection with tables, it is pointed out that in some case, it may be a large number of combinations for specific functions. In these cases, a negation may be used if this requires less table space than the positive combinatory expression. A negation in this sense means representation of illegal combinations as an alternative to representation of legal combinations.

Searching in a table is a simple task. Traversing the table in a linear manner while comparing the sought for parameters in the pertaining rows/columns is performed so as to identify the columns/rows fulfilling the search strategy, and the pertaining event(s) may then be found and provided to a user.

Figure 4:
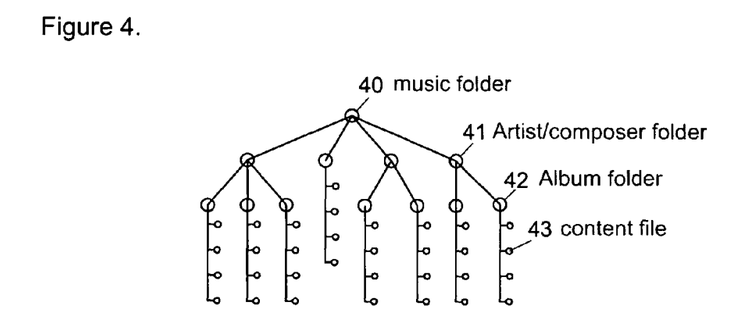
FIG. 4 displays a prior art tree structure organisation.

FIG. 4 is a general model of a tree oriented file collection know from the prior art.

For example, a music collection of audio media files may be organized in folders like:

Music folder 40, Artist/composer folders (at level 41), Album folders (at level 42, and content files 43. The structure may be considered logically as an 'If xx Then yy' structure. It is well known that the premises for the statement to be true for a given conclusion must be searched for in the tree structure. An inconvenient and resource consuming search strategy must be applied, e.g. the depth-first, or breath-first including backtracking, to identify one specific object e.g. a file in the hierarchy. This search for alternatives is relevant when user request with a given set of premises does not imply a conclusion that's useful for the user. In fact the user knows the object he/she wants to obtain but don't know the path, i.e. the premises, to reach the object.

Figure 5:
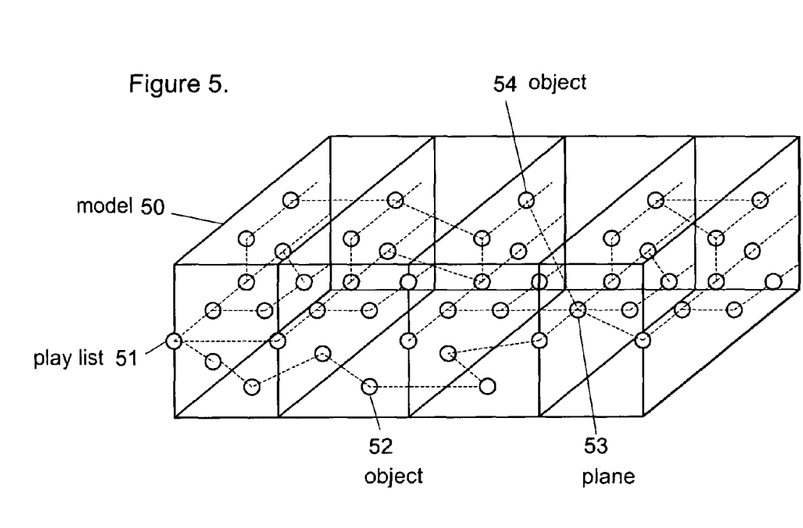

FIG. 5 illustrates an example of a model 50 of viewing the operation of the table according to the present embodiment where all objects may be related via constraints. It may be considered as a universe, multidimensional and all-to-all relations. Individual objects 52, and/or plays lists 51 containing one or more objects may be interrelated. The model may represent different planes 53 containing individual objects, objects that may be interrelated to other objects 54 in other planes.

Selection and data reduction is based on the filter attributes and user commands passed to the constraint solver 11 via the application 14. The object identified to be a legal combination fulfilling the search/filter criteria is displayed at the user interface.

In the case where the search did not meet the user expectations, the user has the option to force deselected objects to be a part of a valid solution. Alternatives may be displayed by the constraint solver, the alternatives being one or more of the defined set of legal combination in the constraint table.

The example illustrates alternative solutions for x, y when y is given:

The: If xx Then yy may be represented as xx->yy

With the truth table:

| x | y | xx -> yy |
|---|---|----------|
| 0 | 0 | 1 |
| 0 | 1 | 1 |
| 1 | 0 | 0 |
| 1 | 1 | 1 |

Given the premise x is '1' the conclusion y is '1'.

Given the conclusion y is '1' the premises for x may be '1' or '0'.

Thus, when y is '1' the alternatives for x are '1' or '0'.

Represented in a constraint table the 'xx->yy' has the legal combinations of x, y:

| x | y |
|---|---|
| 0 | 0 |
| 0 | 1 |
| 1 | 1 |

Table entries in a constraint table may be combined into legal/illegal combination such that all the well known logical operators known from the Boolean algebra will be included as required. The logical operators being: AND, OR, NOT, XOR, Logical Implication (->), Logical Bi-implication (=).

Figure 6:
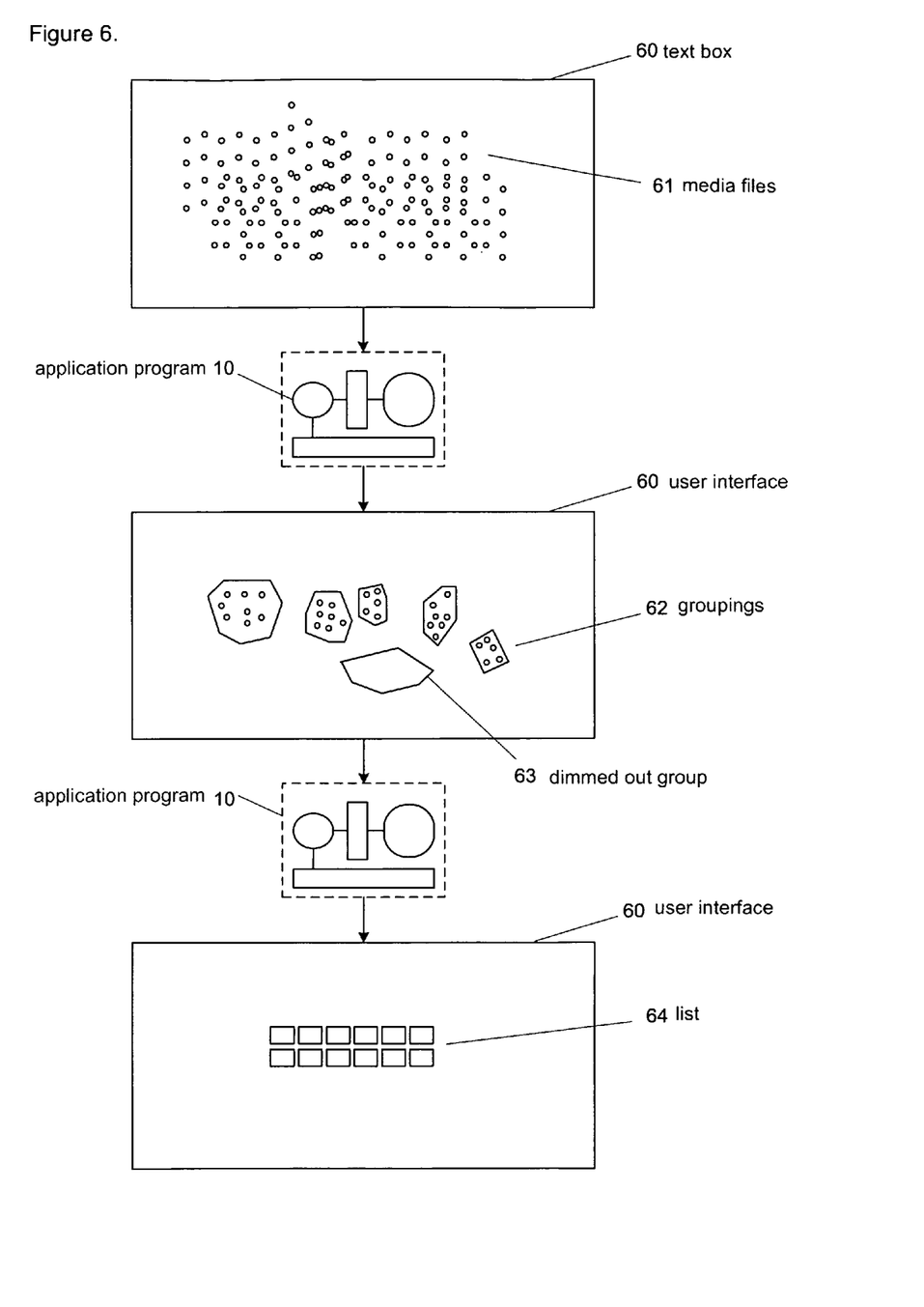
FIG. 6 displays data mapping modes controlled by a constraint solver.

FIG. 6 displays how a number objects via filtering may be mapped into different presentation forms on the user interface 60. The transformation is executed by the constraint solver and the application program 10.

The universe of media files is displayed at 61. The form may be considered as chaotic and with no organisation. There may be a plurality of different objects being of one or more media file types, e.g. but not limited to music, video, photo and text.

Mapping into another mode of presentation may be executed using a set of filter attributes passed to the constraint solver, criteria like, but not limited to: specific seed, object/file type, letters, color, mots (more of the same) and moods.

The merging and clustering into identical groupings is displayed at 62. The groupings reflect the attributes in the previous step above. Optionally one of the groups may be 'dimmed out' 63 i.e. it is categorized by the constraint solver to not fulfil the search criteria. Optionally the user may force selection of objects within this group, and get assistance by the constraint to identify premises that may be relevant to use to obtain the specific goal.

Mapping into another mode of presentation may be executed using a set of filter attributes passed to the constraint solver, criteria like, but not limited to: date, album, composer, and artist, event and category.

The content of one cluster is a list 64 of objects fulfilling the search criteria given in the previous step above. The list of objects may be presented in any form, graphical or non-graphical as: a simple list, a stack, floats freely, organized vertically, horizontally, diagonally, radial, spiral, and concentric circles.

The invention claimed is:

1. A system for identifying a plurality of events, each event characterized by one or more parameters of a plurality of parameters, the system comprising:
a device configured to store or access a constraint table, the constraint table containing entries that are constraints, including all permissible combinations of the plurality of parameters, the constraint table having a plurality of columns and rows, wherein:
each row represents a permissible combination of the plurality of parameters,
each column of the plurality of columns representing one or more of the parameters, and
at least one row of the plurality of rows including:
an identification of a first plurality of events, and
information pertaining to the at least one parameter in each column that characterizes each of said first plurality of events,
a processor configured to select at least one event, the at least one event including one or more desired parameters or intervals of a first group including:
one or more desired parameters, and
one or more desired intervals of one or more desired parameters, by
identifying one or more rows in which the information of one or more columns representing the desired one or more parameters or intervals corresponds to the desired one or more parameters or intervals of the first group, and
selecting the at least one event from the identifications of the identified one or more rows.

2. The system according to claim 1, wherein the processor is configured to receive:
an identification of an additional event, and
information relating to at least one parameter characterizing the identified additional event, and
add, to the constraint table, a new row having the identification of the identified additional event and, configured to add parameter information characterizing the identified additional event in at least one of the plurality of columns.

3. The system according to claim 1, wherein the processor is configured to receive:
an identification of an additional event, and
information relating to at least one parameter characterizing the identified additional event, and
identify a row having information pertaining to the parameter information that characterizes the identified additional event in a corresponding column, and configured to add the identification of the identified additional event to the identification provided in the identified row.

4. The system according to claim 1, wherein the at least one parameter relates to an identity of the user that is allowed to or prevented from accessing the at least one event, wherein the processor is configured to:
determine an identity of the user, and
evaluate, from the at least one parameter of an identified row, whether the user is prevented from or allowed to access the at least one event and configured to allow the user to access or prevent the user from accessing the at least one event.

5. The system according to claim 1, wherein the plurality of events include different events that are provided to the user in different ways, wherein the at least one parameter relates to providing at least one of the different events, wherein the system is configured to identify an available event, and identify a row of the available event and the at least one column representing the at least one parameter characterizing the available event.

6. The system according to claim 1, wherein the processor is further configured to select a sub-group of the selected plurality of events on the basis of additional selection parameters.

7. The system according to claim 1, wherein the system is further configured to provide the selected at least one event to the user.

8. The system according to claim 1, wherein the processor is further configured to, for each of the plurality of rows, perform a comparison, for each of the desired parameters, of the at least one of the desired value and desired interval and the information in the pertaining columns of the identified row, and identify the row in which information corresponds to the at least one desired value and desired interval for all desired parameters.

9. A method of identifying a plurality of events, each event characterized by one or more parameters of a plurality of parameters, the method comprising:
providing or accessing, using a processor, a constraint table, the constraint table containing entries that are constraints, including all permissible combinations of the plurality of parameters, the constraint table having a plurality of columns and rows, wherein:
each column represents at least one of the parameters, and
each row represents a permissible combination of the plurality of parameters,
at least one row of the plurality of rows including:
an identification of a first plurality of the events, and
information pertaining to the at least one parameter in each column that characterizes each of said first plurality of events,
selecting, using the processor, one or more events including one or more desired parameters/intervals parameters or intervals of a first group including:
one or more desired parameters, and
one or more desired intervals of one or more desired parameters, by
identifying one or more rows in which the information of one or more columns representing the desired one or more parameters or intervals corresponds to the desired one or more parameters or intervals of the first group, and
selecting the at least one event from the identifications of the identified one or more rows.

10. The method according to claim 9, further comprising:
receiving or obtaining:
an identification of an additional event, and
information relating to at least one parameter characterizing the identified additional event, and
adding, to the constraint table, a new row having the identification of the identified additional event and, parameter information characterizing the identified additional event in at least one of the plurality of columns.

11. The method according to claim 9, further comprising:
receiving an identification of an additional event, and
receiving information relating to at least one parameter characterizing the identified additional event, and
identifying a row having information pertaining to the parameter in formation that characterizes the identified additional event in a corresponding column, and adding the identification of the identified additional event to the identification provided in the identified row.

12. The method according to claim 9, wherein the at least one parameter relates to an identity of the user that is allowed to or prevented from accessing the at least one event, the method further comprising:

determining an identity of the user, and evaluating, from the at least one parameter of an identified row, whether the user is prevented from or allowed to access the at least one event and allowing the user to access or preventing the user from accessing the at least one event.

13. The method according to claim 9, wherein the plurality of events include different events that are provided to the user in different ways, wherein the at least one parameter relates to providing at least one of the different events, the method further comprising:

identifying an available event, and identifying a row of the available event and the at least one column representing the at least one parameter characterizing the available event.

14. The method according to claim 9, wherein the identifying further comprises selecting a sub-group of the selected plurality of events on the basis of additional selection parameters.

15. The method according to claim 9, further comprising: providing the selected at least one event to the user.

16. The method according to claim 9, wherein the identifying comprises, for each of the plurality of rows, performing a comparison, for each of the desired parameters, of the at least one of the desired value and desired interval and the information in the pertaining columns of the identified row, and identify the row in which the information corresponds to the at least one desired value and desired interval.

17. The system according to claim 1, wherein:

the processor is also configured to allow a user to allow events not selected during a search operation within the constraint table to be a part of a search result of the search operation, and display alternatives including at least one additional parameter from the permissible parameter combinations in the constraint table.

18. The method according to claim 9, further comprising:

allowing a user to allow events not selected during a search operation within the constraint table to be a part of a search result of the search operation, and displaying alternatives including at least one additional parameter of the permissible parameter combinations in the constraint table.

* * * * *